US012135572B2

(12) United States Patent
Cattani et al.

(10) Patent No.: US 12,135,572 B2
(45) Date of Patent: Nov. 5, 2024

(54) DISCHARGE CIRCUIT AND METHOD FOR VOLTAGE TRANSITION MANAGEMENT

(71) Applicant: STMicroelectronics S.r.l., Agrate Brianza (IT)

(72) Inventors: Alberto Cattani, Cislago (IT); Alessandro Gasparini, Cusano Milanino (IT); Stefano Ramorini, Milan (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 264 days.

(21) Appl. No.: 17/694,182

(22) Filed: Mar. 14, 2022

(65) Prior Publication Data

US 2023/0288946 A1 Sep. 14, 2023

(51) Int. Cl.
*G05F 1/56* (2006.01)

(52) U.S. Cl.
CPC .................................... *G05F 1/56* (2013.01)

(58) Field of Classification Search
CPC ... G05F 1/46; G05F 1/468; G05F 1/56; G05F 1/561; G05F 1/562; G05F 1/563; G05F 1/575; G05F 1/585; G05F 1/59; G05F 1/62; G05F 3/08; G05F 3/16; G05F 3/18; G05F 3/185; G05F 3/205; G05F 3/22; G05F 3/24; G05F 3/26–267; H02M 3/02; H02M 3/04; H02M 3/06; H02M 3/07; H02M 3/071; H02M 3/10; H02M 3/135; H02M 3/137; H02M 3/145; H02M 3/155; H02M 3/1552; H02M 3/156; H02M 3/158; H02M 3/1582; H02M 3/1588; H02M 1/0016; H02M 1/0025; H02M 1/0029; H02M 1/14; H02M 1/143; H02M 1/15; H02M 1/32; H02M 1/34–348
USPC ........ 323/259, 266, 271–275, 282–285, 304, 323/311–317, 351; 363/63, 123, 124; 327/131–140
See application file for complete search history.

(56) References Cited

U.S. PATENT DOCUMENTS

| | | | | |
|---|---|---|---|---|
| 8,461,815 | B1 | 6/2013 | Ngo | |
| 8,587,268 | B1 | 11/2013 | Huard | |
| 9,866,119 | B2 | 1/2018 | Lin et al. | |
| 10,664,029 | B2 | 5/2020 | Koga | |
| 11,018,576 | B2 | 5/2021 | Lorin | |
| 2004/0051581 | A1 * | 3/2004 | Abe | G05F 3/30 327/539 |
| 2011/0063277 | A1 | 3/2011 | Menke et al. | |

(Continued)

*Primary Examiner* — Thienvu V Tran
*Assistant Examiner* — Carlos O Rivera-Perez
(74) *Attorney, Agent, or Firm* — Slater Matsil, LLP

(57) ABSTRACT

In an embodiment, a method includes: providing a voltage setpoint to a voltage converter; generating an output voltage at a voltage rail with the voltage converter based on the voltage setpoint; when the voltage setpoint is transitioning from a first voltage setpoint to a second voltage setpoint that has a lower magnitude than the first voltage setpoint, providing a first constant current to a first node coupled to a control terminal of an output transistor to turn on the output transistor, where the output transistor includes a source terminal coupled to a first terminal of a first resistor, and where a current path of the output transistor is coupled to the voltage rail; and turning off the output transistor after the output voltage reaches the target output voltage corresponding to the second voltage setpoint.

20 Claims, 5 Drawing Sheets

(56) References Cited

U.S. PATENT DOCUMENTS

| | | | |
|---|---|---|---|
| 2015/0340890 | A1 | 11/2015 | Yao et al. |
| 2016/0149490 | A1* | 5/2016 | Nakamura ............ H02J 7/0063 323/271 |
| 2017/0199537 | A1* | 7/2017 | Duong .................... G05F 1/575 |
| 2018/0097513 | A1* | 4/2018 | Couleur .................... H03L 5/02 |
| 2019/0238052 | A1 | 8/2019 | Lorin |

* cited by examiner

Prior Art

DISCHARGE CIRCUIT AND METHOD FOR VOLTAGE TRANSITION MANAGEMENT

TECHNICAL FIELD

The present disclosure relates generally to an electronic system and method, and, in particular embodiments, to a Discharge Circuit and Method for Voltage Transition Management.

BACKGROUND

DC-DC converters are widely used in many applications. Examples of DC-DC converters include non-inverting DC-DC converters, such as buck converters, boost converters, buck-boost converters, and flyback converters, as well as inverting DC-DC converters, such as inverting buck converters, inverting boost converters, and inverting buck-boost converters.

Some DC-DC converters can dynamically change the output voltage based on a received voltage setpoint. For example, a first voltage setpoint (which may be digital or analog) may be indicative of a 5 V voltage. A second voltage setpoint may be indicative of 20 V. Changing the voltage setpoint from the first voltage set point to the second voltage set point causes the output voltage of the DC-DC converter to change from 5 V to 20 V.

In some applications, it is desirable for the output of the DC-DC converter to exhibit a fast transition when the voltage setpoint of the DC-DC converter is changed. Some DC-DC converters use a discharge circuit to facilitate a fast voltage transition during a change in voltage setpoint. For example, FIG. 1 shows exemplary non-inverting DC-DC converter 102 with discharge circuit 104. When the voltage setpoint of DC-DC converter 102 is lowered (e.g., from 20 V to 5 V), voltage $Vg_{108}$ transitions from low to high to fully turn on transistor 108 and discharge output voltage $V_{outp}$ to facilitate the lowering of the output voltage $V_{outp}$. Once the output voltage $V_{outp}$ reaches the new target (e.g., 5 V), voltage $Vg_{108}$ transitions from high to low to fully turn off transistor 108 and stop discharging the output voltage $V_{outp}$.

FIG. 2 shows exemplary inverting DC-DC converter 202 with discharge circuit 104. When the voltage setpoint of DC-DC converter 102 is increased (e.g., from −5 V to −1 V), voltage $Vg_{108}$ transitions from low to high to fully turn on transistor 108 and discharge output voltage $V_{outn}$ to facilitate the increase of the output voltage $V_{outn}$. Once the output voltage $V_{outn}$ reaches the new target (e.g., −1 V), voltage $Vg_{108}$ transitions from high to low to fully turn off transistor 108 and stop discharging the output voltage $V_{outn}$.

As shown in FIG. 2, resistor 106 is connected to the drain of transistor 108. Connecting the resistor to the drain of the transistor is the conventional way to connect a resistor (e.g., 106) load to a switch (e.g., 108), which advantageously causes all the voltage drop to occur in the resistor (since the resistance of the resistive load is generally much higher than the resistance of the switch).

SUMMARY

In accordance with an embodiment, a method includes: providing a voltage setpoint to a voltage converter where the voltage setpoint is indicative of a target output voltage of the voltage converter; generating an output voltage at a voltage rail with the voltage converter based on the voltage setpoint; when the voltage setpoint is transitioning from a first voltage setpoint to a second voltage setpoint that has a lower magnitude than the first voltage setpoint, providing a first constant current to a first node coupled to a control terminal of an output transistor to turn on the output transistor, where the output transistor includes a source terminal coupled to a first terminal of a first resistor, and a drain terminal coupled to a first terminal of a load, where a second terminal of the first resistor is coupled to a second terminal of the load, and where a current path of the output transistor is coupled to the voltage rail; and turning off the output transistor after the output voltage reaches the target output voltage corresponding to the second voltage setpoint.

In accordance with an embodiment, a circuit includes: a voltage converter having an output coupled to a voltage rail and configured to generate, at the output of the voltage converter, an output voltage based on a voltage setpoint, where the voltage setpoint is indicative of a target output voltage of the voltage converter; an output transistor having a current path coupled to the voltage rail; a first resistor having a first terminal coupled to a source terminal of the output transistor; and a control circuit configured to: provide the voltage setpoint to the voltage converter; when the voltage setpoint is transitioning from a first voltage setpoint to a second voltage setpoint that has a lower magnitude than the first voltage setpoint, cause a first constant current to be provided to a first node that is coupled to the control terminal of the output transistor to turn on the output transistor; and cause the output transistor to turn off after the output voltage reaches the target output voltage corresponding to the second voltage setpoint.

In accordance with an embodiment, a circuit includes: a voltage converter having an output coupled to a voltage rail and configured to generate, at the output of the voltage converter, an output voltage based on a voltage setpoint, where the voltage setpoint is indicative of a target output voltage of the voltage converter; an output transistor having a current path coupled to the voltage rail and a control terminal coupled to a first node; a first resistor having a first terminal coupled to a source terminal of the output transistor; a capacitor coupled to the first node; a first transistor having a current path coupled between a first supply voltage terminal and the first node; a first current mirror including a second transistor and a third transistor, the second transistor having a current path coupled between the first node and a second terminal of the first resistor; a fourth transistor having a current path coupled between the first supply voltage terminal and a current path of the third transistor; a fifth transistor having a current path coupled to the current path of the first transistor; a sixth transistor having a current path coupled to the current path of the fourth transistor; a current source configured to generate a bias current; a seventh transistor having a current path coupled to the current source, and a control terminal coupled to the current source and to control terminals of the fifth and sixth transistors; and a control circuit configured to: provide the voltage setpoint to the voltage converter, control the first and fourth transistors based on the voltage setpoint.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in specific contexts, e.g., a discharge circuit and method for voltage transition management of the output of a DC-DC converter. Some embodiments may be used with other types of converters, such as AC/DC converters and linear converters.

In an embodiment of the present invention, a degenerated output transistor is used to discharge the output voltage of a DC-DC converter during a voltage setpoint transition to a lower magnitude. In some embodiments, the gate of the output transistor is driven with a constant current to generate respective linear voltage ramp at the gate and source terminals of the degenerated transistor, thereby applying a discharge current with a controlled slope to the output of the DC-DC converter during the voltage setpoint transition to a lower magnitude. By applying a discharge current with a controlled slope to the output of the DC-DC converter, some embodiments advantageously avoid fast discharge current variations, thereby reducing or eliminating undesired voltage variations of the output voltage of the DC-DC converter.

In some embodiments, the output transistor is kept off during steady state of the output voltage, or when the output voltage increases in magnitude, thereby advantageously reducing power consumption. In some embodiments, the activation and deactivation of the output transistor is controlled by the same controller that controls the voltage setpoint of the DC-DC converter.

Figure 1:
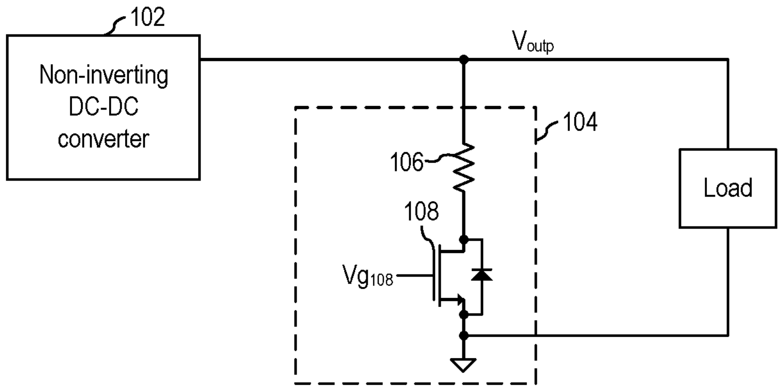
FIG. 1 Prior Art
FIGS. 1 and 2 shows exemplary DC-DC converters with a discharge circuit.
Figure 2:
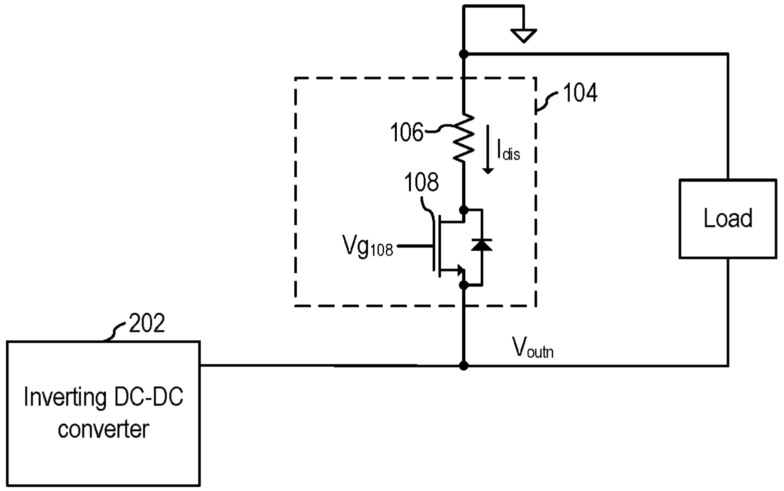
Figure 3:
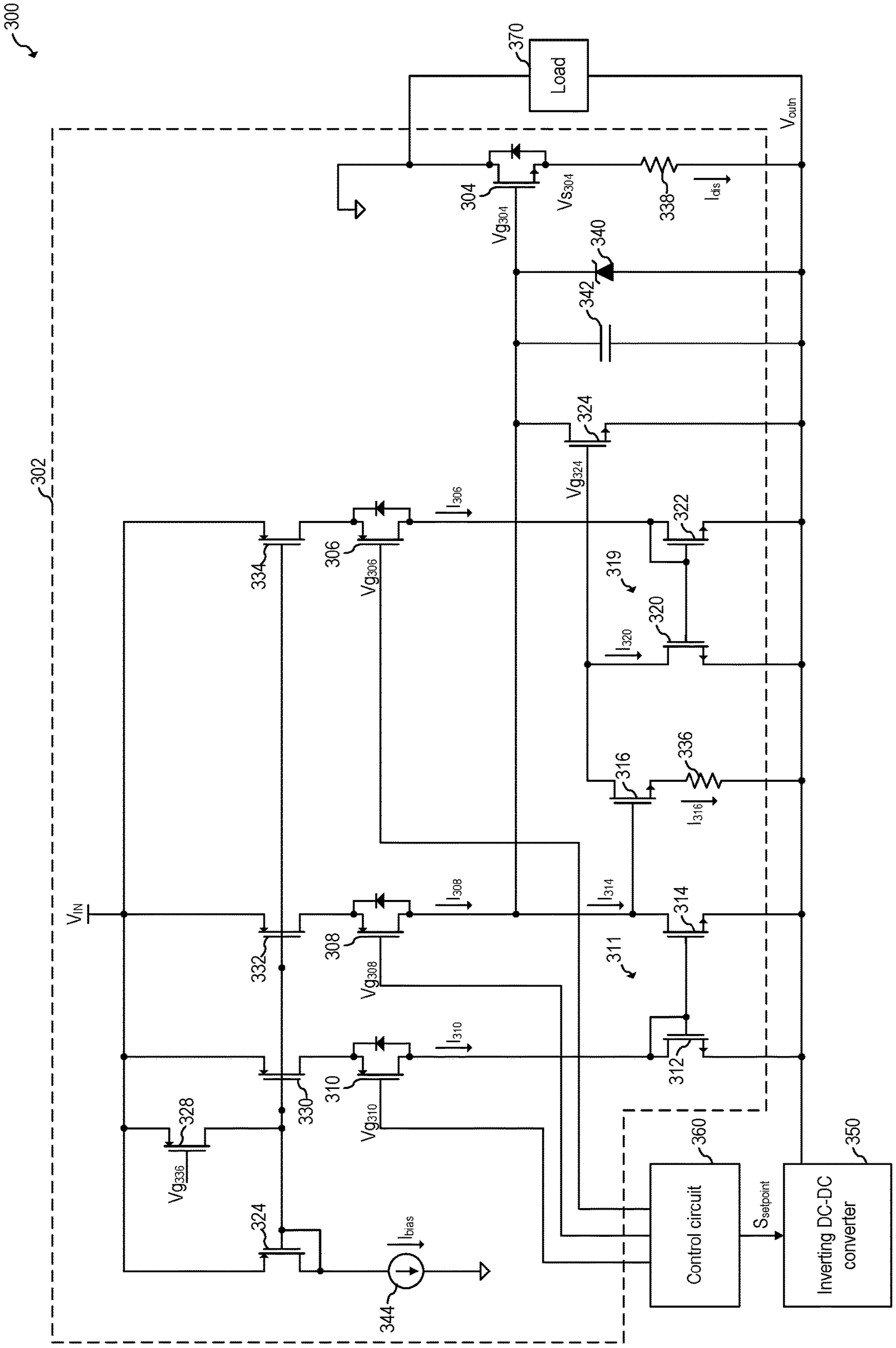
FIG. 3 shows a schematic diagram of a power management circuit producing a negative voltage rail, according to an embodiment of the present invention.

FIG. 3 shows a schematic diagram of power management circuit 300, according to an embodiment of the present invention. Power management circuit 300 supplies negative output voltage $V_{outn}$ to load 370 and includes control circuit 360, inverting DC-DC converter 350, and discharge circuit 302. Discharge circuit 302 includes, transistors 304, 306, 308, 310, 312, 314, 316, 318, 320, 322, 324, 326, 328, 330, 332, and 334, resistors 336 and 338, Zener diode 340, capacitor 342, and current source 344.

In some embodiments, inverting DC-DC converter 350 provides a negative voltage $V_{outn}$ (also referred to as a negative rail), where the magnitude of the negative voltage $V_{outn}$ depends on the voltage setpoint $S_{setpoint}$ provided by control circuit 360. In some embodiments, inverting DC-DC converter 350 may be implemented in any way known in the art. For example, in some embodiments, inverting DC-DC converter 350 may be implemented as an inverting buck, an inverting boost, or an inverting buck-boost. Other implementations are also possible.

In some embodiments, inverting DC-DC converter 350 is capable of regulating the output voltage during a transition from a high voltage (e.g., −1 V) to a low voltage (e.g., −9 V). In some embodiments, DC-DC converter 350 has a limited ability to regulate the output voltage during a transition from a low voltage (e.g., −9 V) to a high voltage (−1 V) and, e.g., may rely on the load current to discharge the voltage.

Control circuit 360 provides the voltage setpoint $S_{setpoint}$ to inverting DC-DC converter 350, e.g., based on a request from an external controller (not shown). Control circuit 360 also controls discharge circuit 302 by controlling voltages $Vg_{306}$, $Vg_{308}$, and $Vg_{310}$.

When negative voltage $V_{outn}$ is not changing or when negative voltage $V_{outn}$ transitions to a lower voltage (e.g., from −1V to −9 V), control circuit 360 keeps voltage $Vg_{310}$ at a low voltage and voltages $Vg_{306}$ and $Vg_{308}$ at a high voltage to keep transistor 310 on and transistors 306 and 308 off. Transistor 310 being on causes transistor 330 to mirror current $I_{bias}$ into current $I_{310}$ which flows through transistor 312. Since transistors 312 and 314 form a current mirror (311), current $I_{310}$ is mirrored into current $I_{314}$, which pulls down voltage $Vg_{304}$. Since transistor 308 is off, voltage $Vg_{304}$ is low and transistor 304 is off, which causes no current to flow through transistor 304 ($I_{dis}$=0 mA). Thus, in some embodiments, when negative voltage $V_{outn}$ is not changing or when negative voltage $V_{outn}$ transitions to a lower voltage, transistor 304 does not discharge negative output voltage $V_{outn}$.

When negative voltage $V_{outn}$ transitions to a higher voltage (e.g., from −9 V to −1 V), control circuit rises voltage $Vg_{310}$ to a high voltage to turn off transistor 310 and decreases voltages $Vg_{306}$ and $Vg_{308}$ to a low voltage to turn on transistors 306 and 308. Since transistor 306 is on, transistor 334 mirrors current $I_{bias}$ into current $I_{306}$ which flows through transistor 322. Current $I_{306}$ is mirrored into current $I_{320}$ by current mirror 319 (formed by transistors 320 and 322), which pulls down voltage $Vg_{324}$, which causes transistor 324 to turn off.

Since transistor 310 is off when negative voltage $V_{outn}$ transitions to a lower voltage, current $I_{310}$ is zero, which causes transistor 314 to be off. Since transistor 308 is on when negative voltage $V_{outn}$ transitions to a lower voltage, transistor 308 mirrors current $I_{bias}$ into current $I_{308}$, which pulls up voltage $Vg_{304}$ to turn on transistor 304, e.g., with a voltage ramp by injecting current $I_{308}$ into capacitor 342. The pulling up of voltage $Vg_{304}$ also causes transistor 316 to turn on, which causes current $I_{316}$ to pull down voltage $Vg_{324}$ and causes (e.g., in cooperation with transistor 320) transistor 324 to turn off and remain off. As shown in FIG. 3, in some embodiments, a resistor (336) is connected to the source of transistor 316 to limit current $I_{316}$.

As shown in FIG. 3, in some embodiments, the activation (turning on) of transistor 306 causes transistor 324 to turn off while transistor 308 pulls up voltage $Vg_{304}$, which advantageously prevents transistor 324 from pulling down voltage $Vg_{314}$ while transistor 308 is pulling up voltage $Vg_{304}$ (e.g., since transistor 316 turns on when voltage $Vg_{304}$ increases, and thus cannot initially help keep transistor 324 off during the beginning of the pulling up of voltage $Vg_{304}$).

After negative output voltage reaches (e.g., settles) into the new higher voltage (e.g., —1V), control circuit 360 decreases voltage $Vg_{310}$ to the low level and rises voltages $Vg_{306}$ and $Vg_{308}$ to the high level to turn on transistor 310 and turn off transistors 306 and 308. The turning on of transistor 310 and the turning off of transistors 306 and 308 causes current $I_{314}$ to pull down voltage $Vg_{304}$, e.g., with a voltage ramp, by discharging capacitor 342 with a constant current.

In some embodiments, current source 344 generates a bias current $I_{bias}$. In some embodiments, the magnitude of bias current $I_{bias}$ is selected to allow for the pulling up of voltage $Vg_{304}$ (e.g., within a predetermined amount of time) when negative voltage $V_{outn}$ transitions to a lower voltage, and to allow for the pulling down of voltage $Vg_{304}$ (e.g., within a predetermined amount of time) when negative voltage $V_{outn}$ is not changing or when negative voltage $V_{outn}$ transitions to a lower voltage. In some embodiments, current $I_{bias}$ is constant during normal operation. In some embodiments, current $I_{bias}$ is lower when transistor 310 is on and transistors 306 and 308 are off, than when transistor 310 is off and transistors 306 and 308 are on. By keeping current $I_{bias}$ lower when transistor 310 is on and transistors 306 and 308 are off, some embodiments advantageously reduce power consumption when negative voltage $V_{outn}$ is not changing or when negative voltage $V_{outn}$ transitions to a lower voltage.

In some embodiments, Zener diode 340 clamps voltage $Vg_{304}$ and prevents voltage $Vg_{304}$ from increasing beyond a predetermined voltage.

In some embodiments, during normal operation, negative voltage $V_{outn}$ may be between −9 V and −1 V, and voltage $V_{IN}$ may be, e.g., between 2.5 V and 5 V, such as at 3.3 V. Other voltages may also be used.

In some embodiments, power management circuit 300 is part of a power management integrated circuit (PMIC) for supply power to active-matrix organic light-emitting diode (AMOLED)-based display, wherein load 370 comprises a plurality of AMOLEDs. In such embodiments, control circuit 360 may receive requests to change the voltage setpoint of DC-DC converter 350 from a controller (not shown) to control the brightness of the AMOLED-based display.

In some embodiments, transistors 304, 306, 308, 310, 312, 314, 316, 318, 320, 322, 324, 326, 328, 330, 332, and 334 are MOSFETs. As illustrated in FIG. 3, in some embodiments, transistors 304, 306, 308, and 310 are high-voltage transistors while transistors 312, 314, 316, 318, 320, 322, 324, 326, 328, 330, 332, and 334 are low-voltage transistors. In some embodiments, using high-voltage transistors for transistors 304, 306, 308, and 310 advantageously allows for supporting a wide voltage range (e.g., with $V_{IN}$ at, e.g., 5 V, and $V_{outn}$ at, e.g., −9 V) without having to implement all transistors with high-voltage transistors, thereby advantageously keep the circuit size relatively small.

In some embodiments, transistor 328 is used as a power-down switch (e.g., controlled by control circuit 360) for turning fully off discharge circuit 302. For example, in some embodiments, during power-down of discharge circuit 302, control circuit 360 turns on transistor 328, which causes transistors 324, 330, 332, and 334 to turn off, which causes currents $I_{304}$, $I_{306}$, $I_{308}$, $I_{310}$, $I_{314}$, $I_{316}$, and $I_{dis}$ to be zero.

In some embodiments, control circuit 360 may be implemented with a custom or generic controller or processor, e.g., configured to execute instructions stored in memory. In some embodiments, control circuit 360 may be implemented with a state machine. Other implementations are also possible.

As can be seen in FIG. 3, the pull-up circuit (which includes e.g., 344, 324, 332, 334, 308, 306) and the pull-down circuit (which includes, e.g., 344, 324, 330, 310, 312, 314) are current driven, e.g., to advantageously obtain controlled slopes of voltage $Vg_{314}$ and avoid fast current variations on negative output voltage $V_{outn}$. For example, in contrast with discharge circuit 104 (which has resistor 106 connected to the drain of transistor 108), resistor 338 is connected to the source of transistor 304. During the pullup of voltage $Vg_{304}$, transistor 304 begins to turn on, which causes discharge current $I_{dis}$ to increase, which causes source voltage $Vs_{304}$ to increase. Thus, in some embodiments, the gate-to-source voltage (Vgs) of transistor 304 is kept (e.g., about) constant, and voltage $Vs_{304}$ follows voltage $Vg_{304}$. Thus, in some embodiments, voltage $Vg_{304}$ has a linear ramp shape (e.g., caused by constant current $I_{308}$ charging up capacitor 342) during the turn on of transistor 304 (and during the turn-off of transistor 304 by discharging capacitor 342 by constant current $I_{314}$), and voltage $Vs_{304}$ has also a linear ramp shape during the turn on of transistor 304 (and during the turn-off of transistor 304).

Figure 4:
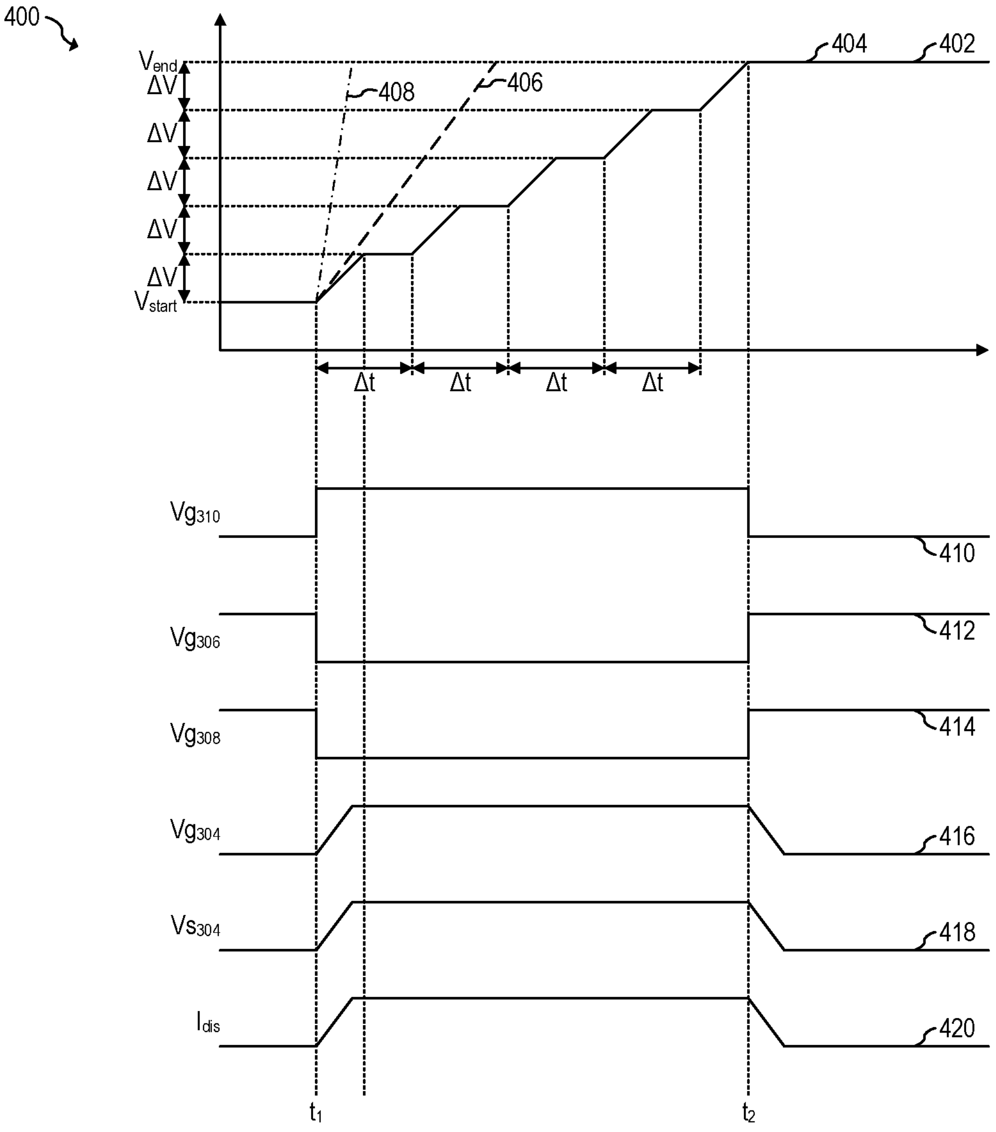
FIG. 4 shows waveforms of the power management circuit of FIG. 3, according to an embodiment of the present invention.

FIG. 4 shows waveforms 400 of power management circuit 300, according to an embodiment of the present invention. Curve 402 representing the voltage setpoint $S_{setpoint}$ for negative voltage $V_{outn}$. Curve 404 represents negative output voltage $V_{outn}$ (which in the embodiment of FIG. 4 matches curve 402). Curve 410 represents voltage $Vg_{310}$. Curve 412 represents voltage $Vg_{306}$. Curve 414 represents voltage $Vg_{308}$. Curve 416 represents voltage $Vg_{304}$. Curve 418 represents voltage $Vs_{304}$. Curve 420 represents discharge current $I_{dis}$.

As shown by curve 404, control circuit 360 begins increasing the voltage setpoint at time $t_1$. As shown in FIG. 4, in some embodiments, the increase in voltage setpoints is performed in steps, such as following a stairway from the starting voltage $V_{start}$ to the ending voltage $V_{end}$ (e.g., as shown in FIG. 4), e.g., by having fixed increments in voltage (e.g., 50 mV) every, e.g., 15 μs (other voltage increments or time intervals are also possible). In some embodiments, $V_{start}$ and $V_{end}$ corresponds to −9 V and −1 V, respectively. Other voltages may also be used.

As shown in FIG. 4, at time $t_1$, transistor 310 is turned off, transistors 306 and 308 are turned on, and voltage $Vg_{304}$ begins to pull up, which causes discharge current to increase with a controlled slope. In some embodiments, the slope of discharge current $I_{dis}$ is higher than the fastest slope of voltage setpoint $S_{setpoint}$. By having the slope of discharge current $I_{dis}$ higher than the fastest slope of voltage setpoint $S_{setpoint}$, some embodiments advantageously pull up negative output voltage $V_{outn}$ with a slope higher than the slope of voltage setpoint $S_{setpoint}$ (e.g., which would follow curve 406 without the close-loop operation of DC-DC converter 350). Since discharge current $I_{dis}$ is sufficient to pull-up voltage $V_{outn}$ to a voltage higher than the voltage setpoint $S_{setpoint}$, DC-DC converter 350 is able to regulate output voltage $V_{outn}$ so that it matches the voltage setpoint $S_{setpoint}$, as shown by curve 404.

As shown in FIG. 4, the slope of discharge current $I_{dis}$ is lower than the slope of the discharge current of discharge circuit 104, which would pull up negative output voltage $V_{outn}$ with a slope higher than the slope of curve 406 and would follow curve 408 without the close-loop operation of DC-DC converter 350. By keeping the slope of discharge current $I_{dis}$ relatively low, some embodiments advantageous mitigate or avoid overshoots and undershoots occurring at times $t_1$ and $t_2$.

As shown in FIG. 4, in some embodiments, transistor 310 is turned off and transistors 306 and 308 are turned on at time t1. In some embodiments, transistor 310 is turned off and transistors 306 and 308 are turned off (e.g., slightly) after time $t_1$.

Although power management circuit 300 has been described with respect to an inverting DC-DC converter 350, a person skilled in the art would know how to adapt power management circuit 300 to operates with a non-inverting DC-DC converter providing a positive voltage rail. For example, in some embodiments, converter 350 may be implemented with a non-inverting DC-DC converter (e.g., buck, boost, or buck-boost), producing a positive output voltage with respect to ground, and discharge circuit 302 may be adapted to be activated during a voltage setpoint transition from high to low.

Figure 5:
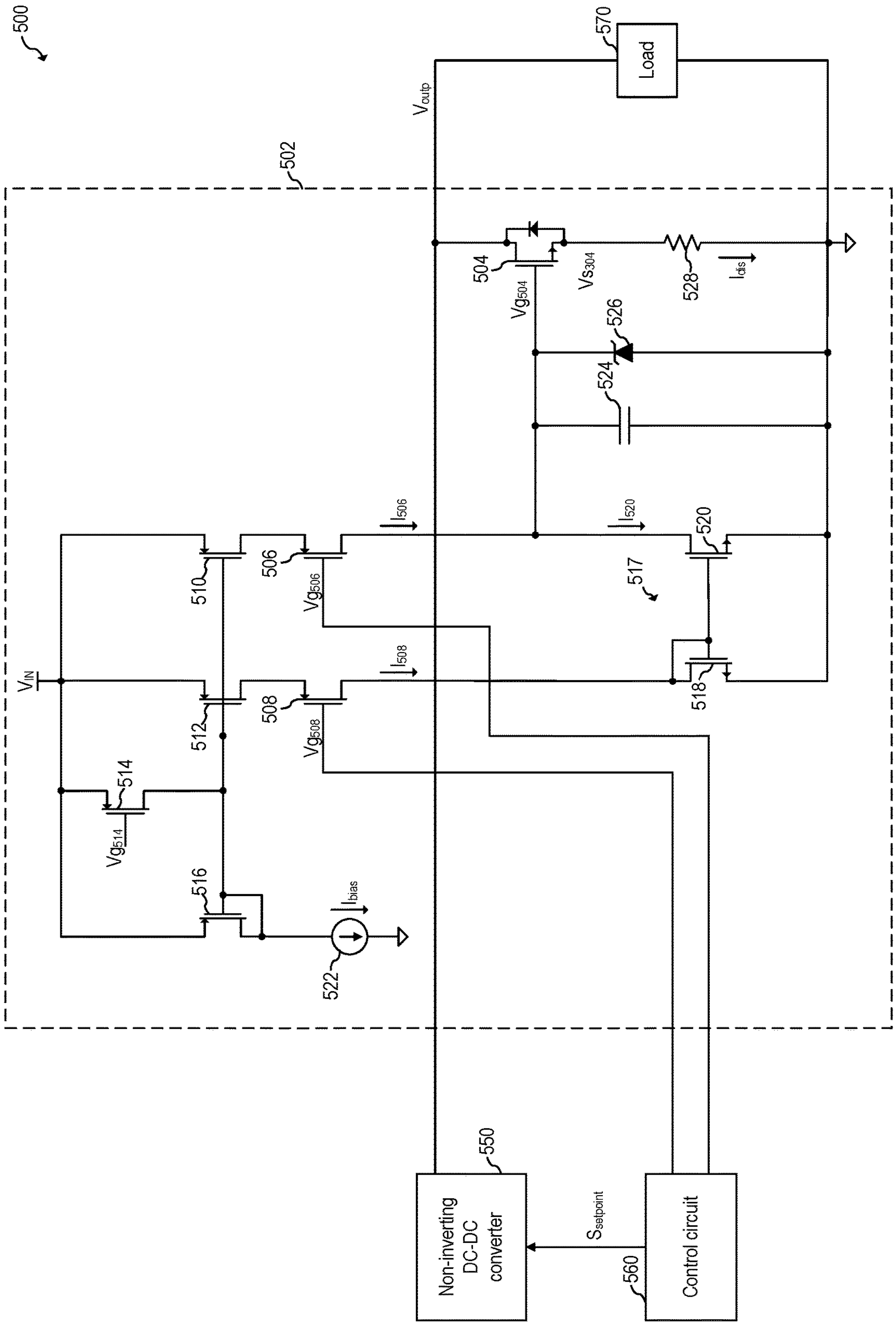
FIG. 5 shows a schematic diagram of a power management circuit producing a positive voltage rail, according to an embodiment of the present invention.

FIG. 5 shows a schematic diagram of power management circuit 500, according to an embodiment of the present invention. Power management circuit 500 supplies positive output voltage $V_{outp}$ to load 570 and includes control circuit 560, non-inverting DC-DC converter 550, and discharge circuit 502. Discharge circuit 502 includes, transistors 504, 506, 508, 510, 512, 514, 516, 518, and 520, resistors 528, Zener diode, capacitor 524, and current source 522.

Power management circuit 500 operates in a similar manner as power management circuit 300. Power management circuit 500, however, generates positive output voltage $V_{outp}$ (with non-inverting DC-DC converter 550) instead of negative output voltage $V_{outn}$, and discharge circuit 502 is activated when positive output voltage $V_{outp}$ transitions to a lower voltage (e.g., from 20 V to 5 V) instead of during a transition to a higher voltage.

For example, when positive voltage $V_{outp}$ is not changing or when positive voltage $V_{outp}$ transitions to a higher voltage (e.g., from 5 V to 20 V), control circuit **56*a* keeps voltage $Vg_{508}$ at a lower voltage and voltage $Vg_{506}$ at a high voltage to keep transistor 508 on and transistor 506 off. Transistor 508 being on causes transistor 512 to mirror current $I_{bias}$ into current $I_{508}$ which flows through transistor 518. Since transistors 518 and 520 form a current mirror (517), current $I_{508}$ is mirrored into current $I_{520}$, which pulls down voltage $Vg_{504}$ turning and keeping off transistor 504 (since transistor 506** is off).

When positive voltage $V_{outp}$ transitions to a lower voltage (e.g., from 20 V to 5 V), control circuit rises voltage $Vg_{508}$ to a high voltage to turn off transistor 508 and decreases voltage $Vg_{506}$ to a low voltage to turn on transistor 506. Since transistor 508 is off, current $I_{520}$ is zero. Since transistor 506 is on, transistor 510 mirrors current $I_{bias}$ into current $I_{506}$ which pulls up voltage $Vg_{504}$, e.g., following a voltage ramp by injecting current $I_{506}$ into capacitor 524.

After positive output voltage reaches (e.g., settles) into the new lower voltage (e.g., 5 V), control circuit 560 decreases voltage $Vg_{508}$ to the low level and rises voltage $Vg_{506}$ to the high level to turn on transistor 508 and turn off transistor 506 to pull down voltage $Vg_{504}$, e.g., with a voltage ramp, by discharging capacitor 524 with a constant current.

In some embodiments, current source 522 operate in a similar manner as current source 344 and may be implemented in a similar manner as current source 344.

In some embodiments, Zener diode 526 clamps voltage $Vg_{504}$ and prevents voltage $Vg_{504}$ from increasing beyond a predetermined voltage.

In some embodiments, during normal operation, positive voltage $V_{outp}$ may be between 5 V and 20 V, and voltage $V_{IN}$ may be, e.g., between 2.5 V and 5 V, such as at 3.3 V. Other voltages may also be used.

In some embodiments, power management circuit 500 is part of a USB source device for supplying a USB voltage rail (e.g., supporting voltages of 20 V, 15 V, 12 V, 9 V, and/or 5 V), where the USB source device supports USB Power Delivery mode and is compatible with any USB standard in effect as of the effective filing date of this application, such as the USB 3.1 standard, and may include a reversible USB connector that does not have a specific plug-in direction, commonly known to those skilled in the art under the name Type-C.

In some embodiments, transistors 504, 506, 508, 510, 512, 514, 516, 518, and 520 are MOSFETs.

In some embodiments, transistor 514 is used as a power-down switch (e.g., controlled by control circuit 560) for turning fully off discharge circuit 502. For example, in some embodiments, during power-down of discharge circuit 502, control circuit 560 turns on transistor 514, which causes transistors 510, 512, and 516 to turn off, which causes currents $I_{506}$, $I_{508}$, $I_{520}$, and $I_{dis}$ to be zero.

In some embodiments, control circuit 560 may be implemented with a custom or generic controller or processor, e.g., configured to execute instructions stored in memory. In some embodiments, control circuit 560 may be implemented with a state machine. Other implementations are also possible.

As can be seen in FIG. 5, and similar to power management circuit 300, the pull-up circuit (which includes e.g., 522, 516, 510, and 506) and the pull-down circuit (which includes, e.g., 522, 516, 512, 508, 518, and 512) are current driven, e.g., to advantageously obtain controlled slopes of voltage $Vg_{504}$ and avoid fast current variations on positive output voltage $V_{outp}$. For example, in contrast with discharge circuit 104 (which has resistor 106 connected to the drain of transistor 108), resistor 528 is connected to the source of transistor 504. During the pullup of voltage $Vg_{504}$, transistor 504 begins to turn on, which causes discharge current $I_{dis}$ to increase, which causes source voltage $Vs_{504}$ to increase. Thus, in some embodiments, the gate-to-source voltage (Vgs) of transistor 504 is kept (e.g., about) constant, and voltage $Vs_{504}$ follows voltage $Vg_{504}$. Thus, in some embodiments, voltage $Vg_{504}$ has a linear ramp shape (e.g., caused by constant current $I_{506}$ charging up capacitor 524) during the turn on of transistor 504 (and during the turn-off of transistor 504 by discharging capacitor 524 with constant current $I_{520}$), and voltage $Vs_{504}$ has also a linear ramp shape during the turn on of transistor 304 (and during the turn-off of transistor 504).

Figure 6:
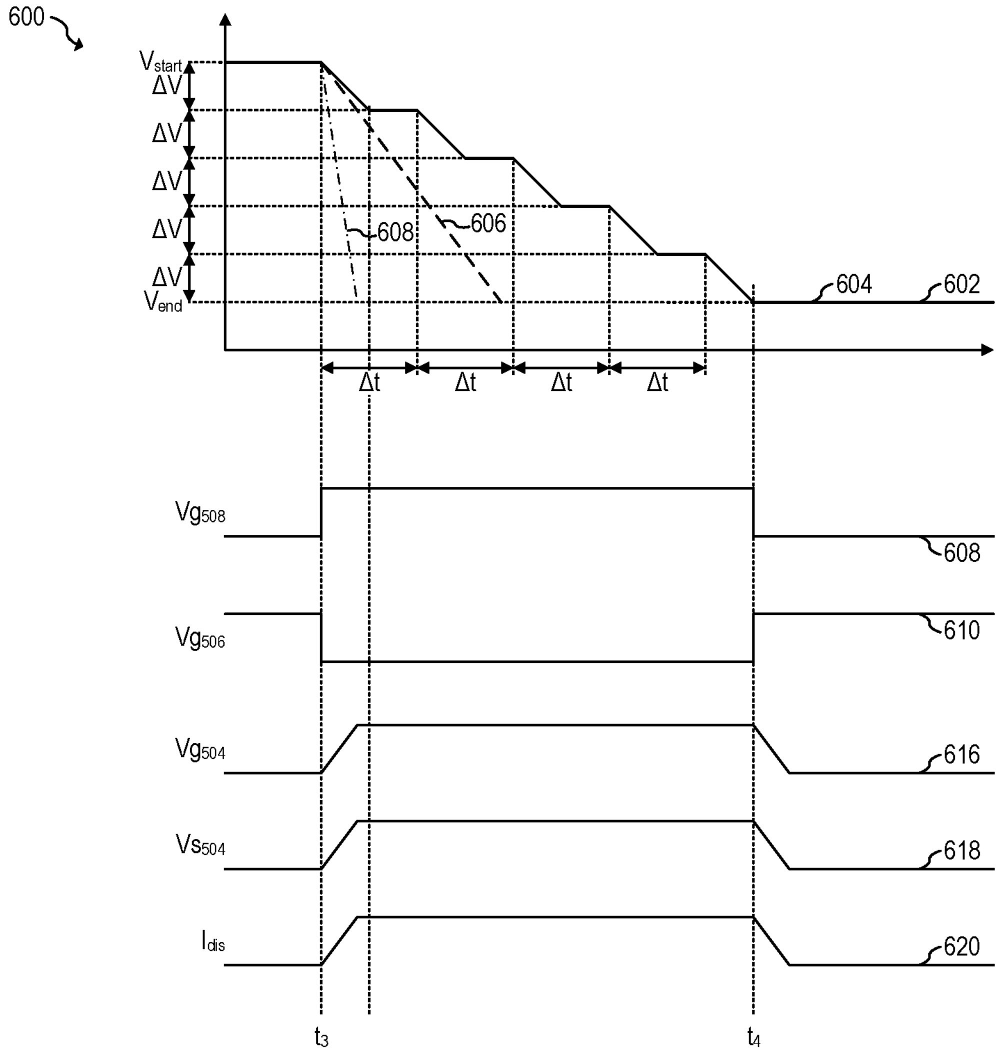
FIG. 6 shows waveforms of the power management circuit of FIG. 5, according to an embodiment of the present invention.

FIG. 6 shows waveforms 600 of power management circuit 500, according to an embodiment of the present invention. Curve 602 representing the voltage setpoint $S_{setpoint}$ for positive voltage $V_{outp}$. Curve 604 represents positive output voltage $V_{outp}$ (which in the embodiment of FIG. 6 matches curve 602). Curve 608 represents voltage $Vg_{508}$. Curve 610 represents voltage $Vg_{950}$. Curve 616 represents voltage $Vg_{614}$. Curve 618 represents voltage $Vs_{604}$. Curve 620 represents discharge current $I_{dis}$.

As shown by curve 604, control circuit 560 begins decreasing the voltage setpoint at time $t_3$. As shown in FIG. 6, in some embodiments, the decrease in voltage setpoints is performed in steps, such as following a stairway from the starting voltage $V_{start}$ to the ending voltage $V_{end}$ (e.g., as shown in FIG. 6), e.g., by having fixed decrements in voltage (e.g., 50 mV) every, e.g., 15 μs (other voltage decrements or time intervals are also possible). In some embodiments, $V_{start}$ and $V_{end}$ corresponds to 20 V and 5 V, respectively. Other voltages may also be used.

As shown in FIG. 6, at time $t_3$, transistor 508 is turned off, transistor 506 is turned on, and voltage $Vg_{504}$ begins to pull up, which causes discharge current to increase with a controlled slope. In some embodiments, the slope of discharge current $I_{dis}$ is steeper than the fastest slope of voltage setpoint $S_{setpoint}$. By having the slope of discharge current $I_{dis}$ steeper than the fastest slope of voltage setpoint $S_{setpoint}$, some embodiments advantageously pull down positive output voltage $V_{outp}$ with a slope steeper than the slope of voltage setpoint $S_{setpoint}$ (e.g., which would follow curve 506 without the close-loop operation of DC-DC converter 550). Since discharge current $I_{dis}$ is sufficient to pull-down voltage $V_{outp}$ to a voltage lower than the voltage setpoint $S_{setpoint}$, DC-DC converter 550 is able to regulate output voltage $V_{outp}$ so that it matches the voltage setpoint $S_{setpoint}$, as shown by curve 604.

As shown in FIG. 6, the slope of discharge current $I_{dis}$ is less steep than the slope of the discharge current of discharge circuit 104, which would pull down positive output voltage $V_{outp}$ with a slope steeper than the slope of curve 606 and would follow curve 608 without the close-loop operation of DC-DC converter 550. By keeping the slope of discharge current $I_{dis}$ not too steep, some embodiments advantageous mitigate or avoid overshoots and undershoots occurring at times $t_3$ and $t_4$.

As shown in FIG. 6, in some embodiments, transistor 508 is turned off and transistors 506 is turned on at time t3. In some embodiments, transistor 508 is turned off and transistor 506 is turned off (e.g., slightly) after time $t_3$.

Although power management circuit 500 has been described with respect to a non-inverting DC-DC converter 550, a person skilled in the art would know how to adapt power management circuit 500 to operates with an inverting DC-DC converter providing a negative voltage rail. For example, in some embodiments, converter 550 may be implemented with an inverting DC-DC converter (e.g., inverting buck, inverting boost, or inverting buck-boost), producing a negative output voltage with respect to ground, and discharge circuit 502 may be adapted to be activated during a voltage setpoint transition from low to high.

Advantages of some embodiments include providing an accurate voltage output (e.g., either negative or positive) that tracks the voltage setpoint during positive and negative transitions, and while reducing or eliminating overshoots and undershoots, e.g., during the beginning (e.g., at $V_{start}$) and end (e.g., $V_{end}$) of the voltage transition. Some embodiments advantageously achieve accurate voltage output without substantially increasing power consumption, e.g., by keeping the discharge circuit off during steady state or when the magnitude of the voltage setpoint increases, and turning on the discharge circuit when the magnitude of the voltage setpoint decreases.

Example embodiments of the present invention are summarized here. Other embodiments can also be understood from the entirety of the specification and the claims filed herein.

Example 1. A method including: providing a voltage setpoint to a voltage converter where the voltage setpoint is indicative of a target output voltage of the voltage converter; generating an output voltage at a voltage rail with the voltage converter based on the voltage setpoint; when the voltage setpoint is transitioning from a first voltage setpoint to a second voltage setpoint that has a lower magnitude than the first voltage setpoint, providing a first constant current to a first node coupled to a control terminal of an output transistor to turn on the output transistor, where the output transistor includes a source terminal coupled to a first terminal of a first resistor, and a drain terminal coupled to a first terminal of a load, where a second terminal of the first resistor is coupled to a second terminal of the load, and where a current path of the output transistor is coupled to the voltage rail; and turning off the output transistor after the output voltage reaches the target output voltage corresponding to the second voltage setpoint.

Example 2. The method of example 1, where turning off the output transistor includes providing a second constant current to the first node, where the second constant current has opposite direction than the first constant current.

Example 3. The method of one of examples 1 or 2, where providing the first constant current to the first node includes injecting the first constant current to a capacitor coupled to the first node, and where providing the second constant current to the first node includes sinking the second constant current from the capacitor.

Example 4. The method of one of examples 1 to 3, where providing the first constant current includes providing the first constant current using a first transistor having a current path coupled between a first supply voltage terminal and the first node, and where providing the second constant current includes using a second transistor having a current path coupled between the first node and the second terminal of the first resistor.

Example 5. The method of one of examples 1 to 4, where turning off the output transistor includes turning off the first transistor and turning on a third transistor having a current path coupled between the first supply voltage terminal and a current path of a fourth transistor, the fourth transistor and the second transistor forming a first current mirror.

Example 6. The method of one of examples 1 to 5, further including turning off a fifth transistor having a current path coupled between the first node and the second terminal of the first resistor when the first transistor is turned on.

Example 7. The method of one of examples 1 to 6, where turning off the fifth transistor includes turning on a sixth transistor having a current path coupled to a second current mirror that is coupled to a control terminal of the fifth transistor.

Example 8. The method of one of examples 1 to 7, where a seventh transistor includes a control terminal coupled to the first node, and a current path coupled between the control terminal of the fifth transistor and a second resistor.

Example 9. The method of one of examples 1 to 8, where providing the first constant current to the first node causes a first voltage ramp at the first node and a second voltage ramp at the source terminal of the output transistor.

Example 10. The method of one of examples 1 to 9, where the voltage setpoint transitions from the first voltage setpoint to the second voltage setpoint in discrete voltage steps.

Example 11. The method of one of examples 1 to 10, where the load includes an active-matrix organic light-emitting diode (AMOLED).

Example 12. The method of one of examples 1 to 11, where generating the output voltage includes generating a negative output voltage.

Example 13. The method of one of examples 1 to 12, where the first voltage setpoint corresponds to −9 V and the second voltage setpoint corresponds to −1 V.

Example 14. The method of one of examples 1 to 13, where the second terminal of the first resistor is coupled to the voltage rail.

Example 15. The method of one of examples 1 to 14, where a Zener diode is coupled between the control terminal of the output transistor and the second terminal of the first resistor.

Example 16. The method of one of examples 1 to 15, where generating the output voltage includes generating a positive output voltage.

Example 17. The method of one of examples 1 to 16, where the first voltage setpoint corresponds to 20 V and the second voltage setpoint corresponds to 5 V.

Example 18. The method of one of examples 1 to 17, where the drain terminal of the output transistor is coupled to the voltage rail.

Example 19. A circuit including: a voltage converter having an output coupled to a voltage rail and configured to generate, at the output of the voltage converter, an output voltage based on a voltage setpoint, where the voltage setpoint is indicative of a target output voltage of the voltage converter; an output transistor having a current path coupled to the voltage rail; a first resistor having a first terminal coupled to a source terminal of the output transistor; and a control circuit configured to: provide the voltage setpoint to the voltage converter; when the voltage setpoint is transitioning from a first voltage setpoint to a second voltage setpoint that has a lower magnitude than the first voltage setpoint, cause a first constant current to be provided to a first node that is coupled to the control terminal of the output transistor to turn on the output transistor; and cause the output transistor to turn off after the output voltage reaches the target output voltage corresponding to the second voltage setpoint.

Example 20. The circuit of example 19, further including: a capacitor coupled to the first node; a first transistor having a current path coupled between a first supply voltage terminal and the first node; and a second transistor having a current path coupled between the first node and a second terminal of the first resistor, where the control circuit is configured to cause the first constant current to be provided to the first node by turning on the first transistor and turning off the second transistor, and where the control circuit is configured to cause the output transistor to turn off by turning off the first transistor and turning on the second transistor.

Example 21. The circuit of one of examples 19 or 20, further including: a first current mirror including the second transistor and a third transistor; and a fourth transistor having a current path coupled between the first supply voltage terminal and a current path of the third transistor, where the control circuit is configured to turn on the second transistor by turning on the fourth transistor.

Example 22. The circuit of one of examples 19 to 21, further including a fifth transistor having a current path coupled between the first node and a second terminal of the first resistor, where the control circuit is configured to turn off the fifth transistor when the first transistor is turned on.

Example 23. The circuit of one of examples 19 to 22, further including: a second current mirror including a sixth transistor and a seventh transistor, the seventh transistor having a current path coupled a control terminal of the fifth transistor; and an eighth transistor having a current path coupled to a current path of the sixth transistor, where the control circuit is configured to turn off the fifth transistor by turning on the eighth transistor.

Example 24. The circuit of one of examples 19 to 23, further including: a ninth transistor having a current path coupled between the control terminal of the fifth transistor and the second terminal of the first resistor; and a second resistor coupled between the current path of the ninth transistor and the second terminal of the first resistor.

Example 25. The circuit of one of examples 19 to 24, further including a Zener diode coupled between the first node and a second terminal of the first resistor.

Example 26. The circuit of one of examples 19 to 25, where the voltage converter is a DC-DC converter.

Example 27. The circuit of one of examples 19 to 26, where the DC-DC converter is an inverting DC-DC converter.

Example 28. The circuit of one of examples 19 to 27, where the DC-DC converter is a non-inverting DC-DC converter.

Example 29. A circuit including: a voltage converter having an output coupled to a voltage rail and configured to generate, at the output of the voltage converter, an output voltage based on a voltage setpoint, where the voltage setpoint is indicative of a target output voltage of the voltage converter; an output transistor having a current path coupled to the voltage rail and a control terminal coupled to a first node; a first resistor having a first terminal coupled to a source terminal of the output transistor; a capacitor coupled to the first node; a first transistor having a current path coupled between a first supply voltage terminal and the first node; a first current mirror including a second transistor and a third transistor, the second transistor having a current path coupled between the first node and a second terminal of the first resistor; a fourth transistor having a current path coupled between the first supply voltage terminal and a current path of the third transistor; a fifth transistor having a current path coupled to the current path of the first transistor; a sixth transistor having a current path coupled to the current path of the fourth transistor; a current source configured to generate a bias current; a seventh transistor having a current path coupled to the current source, and a control terminal coupled to the current source and to control terminals of the fifth and sixth transistors; and a control circuit configured to: provide the voltage setpoint to the voltage converter, control the first and fourth transistors based on the voltage setpoint.

Example 30. The circuit of example 29, further including: an eighth transistor having a current path coupled between the first node and the second terminal of the first resistor; a ninth transistor having a control terminal coupled to the first node and a current path coupled to a control terminal of the eighth transistor; a second current mirror having tenth and eleventh transistors, the tenth transistor having a current path coupled to the control terminal of the eighth transistor; a twelfths transistor having a current path coupled to a current path of the eleventh transistor; and a thirteenth transistor having a current path coupled to the current path of the eleventh transistor and a control terminal coupled to the control terminal of the fifth, sixth, and seventh transistor, where the control circuit is further configured to control the twelfths transistor based on the voltage setpoint.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method comprising:

providing a voltage setpoint to a voltage converter wherein the voltage setpoint is indicative of a target output voltage of the voltage converter;

generating an output voltage at a voltage rail with the voltage converter based on the voltage setpoint;

when the voltage setpoint is transitioning from a first voltage setpoint to a second voltage setpoint that has a lower magnitude than the first voltage setpoint, providing a first constant current to a first node coupled to a control terminal of an output transistor to turn on the output transistor, wherein the output transistor comprises a source terminal coupled to a first terminal of a first resistor, and a drain terminal coupled to a first terminal of a load, wherein a second terminal of the first resistor is coupled to a second terminal of the load, and wherein a current path of the output transistor is coupled to the voltage rail;

when the voltage setpoint is transitioning from the first voltage setpoint to the second voltage setpoint, turning off a fifth transistor having a current path coupled between the first node and the second terminal of the first resistor;

when the voltage setpoint is transitioning from the first voltage setpoint to the second voltage setpoint, turning on a seventh transistor comprising a control terminal coupled to the first node, wherein a current path of the seventh transistor is coupled between a control terminal of the fifth transistor and the voltage rail; and turning off the output transistor after the output voltage reaches the target output voltage corresponding to the second voltage setpoint.

2. The method of claim 1, wherein turning off the output transistor comprises providing a second constant current to the first node, wherein the second constant current has opposite direction than the first constant current.

3. The method of claim 2, wherein providing the first constant current to the first node comprises injecting the first constant current to a capacitor coupled to the first node, and wherein providing the second constant current to the first node comprises sinking the second constant current from the capacitor.

4. The method of claim 3, wherein providing the first constant current comprises providing the first constant current using a first transistor having a current path coupled between a first supply voltage terminal and the first node, and wherein providing the second constant current comprises using a second transistor having a current path coupled between the first node and the second terminal of the first resistor.

5. The method of claim 4, wherein turning off the output transistor comprises turning off the first transistor and turning on a third transistor having a current path coupled between the first supply voltage terminal and a current path of a fourth transistor, the fourth transistor and the second transistor forming a first current mirror.

6. The method of claim 5, wherein turning off the fifth transistor comprises turning on a sixth transistor having a current path coupled to a second current mirror that is coupled to the control terminal of the fifth transistor, and wherein the seventh transistor is coupled between the control terminal of the fifth transistor and a second resistor.

7. The method of claim 1, wherein providing the first constant current to the first node causes a first voltage ramp at the first node and a second voltage ramp at the source terminal of the output transistor.

8. The method of claim 1, wherein the voltage setpoint transitions from the first voltage setpoint to the second voltage setpoint in discrete voltage steps.

9. The method of claim 1, wherein generating the output voltage comprises generating a negative output voltage, and wherein the first voltage setpoint corresponds to −9 V and the second voltage setpoint corresponds to −1 V.

10. The method of claim 1, wherein the second terminal of the first resistor is coupled to the voltage rail.

11. The method of claim 1, wherein generating the output voltage comprises generating a positive output voltage, and wherein the first voltage setpoint corresponds to 20 V and the second voltage setpoint corresponds to 5 V.

12. The method of claim 1, wherein the drain terminal of the output transistor is coupled to the voltage rail.

13. A circuit comprising:

a voltage converter having an output coupled to a voltage rail and configured to generate, at the output of the voltage converter, an output voltage based on a voltage setpoint, wherein the voltage setpoint is indicative of a target output voltage of the voltage converter;

an output transistor having a current path coupled to the voltage rail;

a first resistor having a first terminal coupled to a source terminal of the output transistor;

a fifth transistor having a current path coupled between a first node and a second terminal of the first resistor;

a ninth transistor having a current path coupled between a control terminal of the fifth transistor and the second terminal of the first resistor; and a control circuit configured to:

provide the voltage setpoint to the voltage converter;

when the voltage setpoint is transitioning from a first voltage setpoint to a second voltage setpoint that has a lower magnitude than the first voltage setpoint, cause a first constant current to be provided to the first node that is coupled to a control terminal of the output transistor to turn on the output transistor;

when the voltage setpoint is transitioning from the first voltage setpoint to the second voltage setpoint, turning off the fifth transistor;

when the voltage setpoint is transitioning from the first voltage setpoint to the second voltage setpoint, turning on the ninth transistor; and cause the output transistor to turn off after the output voltage reaches the target output voltage corresponding to the second voltage setpoint.

14. The circuit of claim 13, further comprising:

a capacitor coupled to the first node;

a first transistor having a current path coupled between a first supply voltage terminal and the first node; and a second transistor having a current path coupled between the first node and a second terminal of the first resistor, wherein the control circuit is configured to cause the first constant current to be provided to the first node by turning on the first transistor and turning off the second transistor, and wherein the control circuit is configured to cause the output transistor to turn off by turning off the first transistor and turning on the second transistor.

15. The circuit of claim 14, further comprising:

a first current mirror comprising the second transistor and a third transistor; and a fourth transistor having a current path coupled between the first supply voltage terminal and a current path of the third transistor, wherein the control circuit is configured to turn on the second transistor by turning on the fourth transistor.

16. The circuit of claim 13, further comprising: a second current mirror comprising a sixth transistor and a seventh transistor, the seventh transistor having a current path coupled the control terminal of the fifth transistor; and an eighth transistor having a current path coupled to a current path of the sixth transistor, wherein the control circuit is configured to turn off the fifth transistor by turning on the eighth transistor.

17. The circuit of claim 16, further comprising:

a second resistor coupled between the current path of the ninth transistor and the second terminal of the first resistor.

18. The circuit of claim 13, wherein the voltage converter is an inverting DC-DC converter.

19. A circuit comprising:

a voltage converter having an output coupled to a voltage rail and configured to generate, at the output of the voltage converter, an output voltage based on a voltage setpoint, wherein the voltage setpoint is indicative of a target output voltage of the voltage converter;

an output transistor having a current path coupled to the voltage rail and a control terminal coupled to a first node;

a first resistor having a first terminal coupled to a source terminal of the output transistor;

a capacitor coupled to the first node;

a first transistor having a current path coupled between a first supply voltage terminal and the first node;

a first current mirror comprising a second transistor and a third transistor, the second transistor having a current path coupled between the first node and a second terminal of the first resistor;

a fourth transistor having a current path coupled between the first supply voltage terminal and a current path of the third transistor;

a fifth transistor having a current path coupled to the current path of the first transistor;

a sixth transistor having a current path coupled to the current path of the fourth transistor;

a current source configured to generate a bias current;

a seventh transistor having a current path coupled to the current source, and a control terminal coupled to the current source and to control terminals of the fifth and sixth transistors;

an eighth transistor having a current path coupled between the first node and the second terminal of the first resistor;

a ninth transistor having a control terminal coupled to the first node and a current path coupled to a control terminal of the eighth transistor; and a control circuit configured to:

provide the voltage setpoint to the voltage converter, control the first and fourth transistors based on the voltage setpoint.

20. The circuit of claim 19, further comprising:

a second current mirror having tenth and eleventh transistors, the tenth transistor having a current path coupled to the control terminal of the eighth transistor;

a twelfth transistor having a current path coupled to a current path of the eleventh transistor; and a thirteenth transistor having a current path coupled to the current path of the eleventh transistor and a control terminal coupled to the control terminal of the fifth, sixth, and seventh transistor, wherein the control circuit is further configured to control the twelfth transistor based on the voltage setpoint.

* * * * *